(12) United States Patent
Petrea et al.

(10) Patent No.: US 8,987,168 B2
(45) Date of Patent: *Mar. 24, 2015

(54) METHOD OF TREATING PLANT GROWTH MEDIA WITH MULTI-BRANCHED WETTING AGENTS

(75) Inventors: Randy D. Petrea, Boiling Springs, SC (US); Shirley A. Whiteside, Chesnee, SC (US); Christopher A. Byrd, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 1023 days.

This patent is subject to a terminal disclaimer.

(21) Appl. No.: 12/503,896

(22) Filed: Jul. 16, 2009

(65) Prior Publication Data

US 2009/0272162 A1   Nov. 5, 2009

Related U.S. Application Data

(60) Division of application No. 11/063,187, filed on Feb. 22, 2005, now Pat. No. 7,587,537, which is a continuation-in-part of application No. 10/939,690, filed on Sep. 13, 2004, now Pat. No. 6,948,276, which is a continuation of application No. 10/461,799, filed on Jun. 13, 2003, now Pat. No. 6,857,225.

(51) Int. Cl.

| A01C 1/00 | (2006.01) |
|---|---|
| A01B 79/02 | (2006.01) |
| B01F 17/00 | (2006.01) |
| C09K 17/18 | (2006.01) |
| A01G 1/00 | (2006.01) |
| C09K 17/14 | (2006.01) |
| C09K 17/16 | (2006.01) |

(52) U.S. Cl.
CPC ............... *C09K 17/18* (2013.01); *A01G 1/002* (2013.01); *C09K 17/14* (2013.01); *C09K 17/16* (2013.01)
USPC ........................... 504/101; 47/58.1 SC; 516/9

(58) Field of Classification Search
CPC ............ A01B 79/02; B01F 17/00; A01C 1/00

USPC .................................................. 504/362, 101
See application file for complete search history.

(56) References Cited

U.S. PATENT DOCUMENTS

| 6,079,153 A | 6/2000 | Templeton ........................ 47/59 |
|---|---|---|
| 6,711,850 B2 | 3/2004 | Yelanich et al. ................... 47/59 |
| 7,587,857 B2 * | 9/2009 | Petrea et al. ............. 47/58.1 SC |
| 7,829,500 B2 * | 11/2010 | Hayashi et al. ................ 504/119 |
| 2003/0073583 A1 | 4/2003 | Kostka et al. ................. 504/362 |
| 2004/0261314 A1 | 12/2004 | Petrea et al. ................... 47/58.1 |
| 2005/0028442 A1 | 2/2005 | Petrea et al. ................... 47/58.1 |

FOREIGN PATENT DOCUMENTS

WO    2005/000944    1/2005

OTHER PUBLICATIONS

U.S. Appl. No. 11/063,187, filed Feb. 22, 2005, Petrea et al.
International Search Report. PCT/US2006/004134, mailing date Aug. 6, 2007.

* cited by examiner

*Primary Examiner* — Alton Pryor
(74) *Attorney, Agent, or Firm* — Brenda D. Wentz

(57) ABSTRACT

Certain novel formulations of plant growth media additives that act in such a manner as to permit proper amounts of moisture to contact root systems in order to reduce hydrophobicity within said media. The inventive formulation comprising multi-branched surfactant compounds with both hydrophobic and hydrophilic constituents within each branch attached to a polyfunctional base compound permit effective moisture penetration through plant growth media for sustained seedling and plant growth therein. Such multi-branched wetting agents provide sustained moisture penetration over a sustained period of time, since the individual branches of such compounds may become dissociated from its base polyfunctional compound. Since such branches include both hydrophobic and hydrophilic constituents themselves, and thus act as wetting agents, even after degradation of the initial surfactant compound, repeated wetting and moisture penetration, at least, are permitted. Methods of treating plant growth media with such compounds and formulations thereof are also contemplated within this invention.

4 Claims, No Drawings

METHOD OF TREATING PLANT GROWTH MEDIA WITH MULTI-BRANCHED WETTING AGENTS

CROSS-REFERENCE TO RELATED APPLICATION

This application claims priority to and is a divisional of U.S. patent application Ser. No. 11/063,187 filed on Feb. 22, 2005, now U.S. Pat. No. 7,587,857 which is a continuation-in-part of U.S. patent application Ser. No. 10/939,690 filed on Sep. 13, 2004, now U.S. Pat. No. 6,948,276 which is a continuation of U.S. patent application Ser. No. 10/461,799 filed on Jun. 13, 2003, now U.S. Pat. No. 6,857,225 all of which are hereby incorporated by reference.

FIELD OF THE INVENTION

This invention relates to certain novel compounds that may be used as additives in plant growth media for enhancing the wetting and re-wetting of such soil-free mixtures. The inventive compounds comprise multi-branched surfactants with both hydrophobic and hydrophilic constituents within each branch which are attached to a polyfunctional base compound. These multi-branched compounds permit effective moisture penetration through plant growth media, thereby allowing sustained plant growth therein. Additionally, such multi-branched compounds, or wetting agents, provide sustained moisture penetration over an extended period of time, since the individual branches of such compounds may become dissociated from its base polyfunctional compound. Furthermore, since such branches include both hydrophobic and hydrophilic constituents and thus act as wetting agents, even after degradation of the initial surfactant compound, long-term wetting and moisture penetration are permitted. Methods of treating plant growth media with such compounds and formulations thereof are also contemplated within this invention.

BACKGROUND OF THE INVENTION

Products normally used in the production of plant growth media for greenhouse crop production are often water repellent (hydrophobic). These products, which are generally soil-free, include various organic materials such as peat moss, sphagnum peat, sedge peat, bark, and the like and have proven to be the most difficult conditions in which plant life may be grown. Such hydrophobic conditions basically prevent, or drastically reduce, the ability of water to infiltrate from the ground level to subterranean root systems. Thus, reduction in water repellency would be helpful in permitting and/or promoting the growth of sustained plant life in such organic plant growth media.

Attempts in this area by others have included the application of wetting agents to plant growth media. Wetting agents are generally substances which are added to surface coatings, water, or oils to increase spreading and penetration action. Wetting agents belong to a group of a more general class of materials called "surface active agents," hence the term "surfactants." Characteristic of their properties is the ability to lower surface and interfacial tension between the plant growth media and applied water. Without being bound by theory, it is believed that wetting in soil-free mixtures may occur when the wetting agent is absorbed into, and/or causes inflation of, the natural bladders, or openings, that exist in these organic materials. Wetting may also occur by filling the dead cells within the plant growth media with water.

However, significant problems have been encountered when using some prior art wetting agents. For instance, some wetting agents require "activation" before they become effective, especially if applied in granular form. The granular form tends to become securely adhered to a solid carrier substrate and thus requires repeated cycles of wetting and re-wetting in order to cause the wetting agent to leach from the surface the carrier. Because of this need for activation, it is often the case that increased amounts of wetting agent are needed to provide adequate moisture penetration, which may be expensive and detrimental to the plants. Also, the need for repeated cycles of wetting and re-wetting result in increased water usage which is environmentally wasteful and may be expensive.

Other problems are encountered in the utilization of wetting agent for plant growth media. For instance, many wetting agents lose their ability to effectively wet plant growth media, due to the fact that the plant growth media is dried out for packaging and shipping. The plant growth media may further lose moisture content during storage. As a result of these conditions, the structural openings, or bladders, within the plant growth media tend to close up tightly and keep water from penetrating into the media. Thus, the wetting agents, which often fill these bladders, are not able to come into contact with the water which makes wetting of the plant growth media even more difficult. Furthermore, once activated or in use, the ability of a wetting agent to continuously provide moisture management to the plant growth media tends to decrease over time. As a result of these conditions and properties, the wetting agent has a limited, and often shortened, useful lifespan.

In addition to providing moisture transport within the plant growth media, it is also desirable that the wetting agent possesses other functional attributes. For example, it is desirable that the wetting agent exhibits a sufficient level of durability to repeated cycles of wetting and drying. These conditions are representative of those that the plant growth media may encounter due to rainfall exposure or from repeated cycles of watering in a greenhouse. Additionally, the wetting agent should not interfere with seedling growth, and it is desirable that the wetting agent is environmentally friendly. Also, it is beneficial that the wetting agent is compatible with other horticultural treatments that may be applied to crops, such as herbicides and pesticides.

Thus, it has been found that there exists a need to provide a simple method for achieving effective and long-lasting moisture penetration through such highly hydrophobic plant growth media, in order to obtain water availability at the soil surface, and within the subterranean root systems thereof, without causing detrimental effects to the surface plant life.

DESCRIPTION OF THE INVENTION

It is thus an object of this invention to provide a method for reducing the hydrophobicity of plant growth media by treating the media with a novel additive formulation. The additive formulation comprises a multi-branched oxygen-containing polyfunctional compound-based surfactant exhibiting both hydrophilic and hydrophobic constituents within each branch thereof, and wherein such compound comprises at least three and, preferably, five or greater, such branches thereon. Optionally, the additive formulation may include from about 0.1 to about 99% by weight of at least one other compound that further actively lowers the surface tension of the plant growth media. The formulation may also comprise a copolymer exhibiting both hydrophilic and hydrophobic portions for reaction with the hydrophobic portions of the plant growth media in order to further provide hydrophilic extensions therefrom to facilitate surface tension reductions for effective moisture penetration.

The inventive additive formulation may be applied to the plant growth media in liquid form, pellet form, or granular form. If applied in granular form, a carrier for the wetting agent may be used such as, for example, ground corn cobs and/or husks.

The inventive additive formulation, in terms of composition, thus includes at least one multi-branched oxygen-containing polyfunctional compound-based wetting agent. Such a polyfunctional compound may be a polyol, a polycarboxylic acid, a lactone (the ring structure of which will open upon reaction to provide the necessary reactive sites for surfactant addition thereto), an amino acid, or mixtures thereof, wherein the moieties include highly reactive end groups for reaction with surfactant-like groups to form the desired branches therein. In such a base compound, the oxygen-containing functionalities (oxygen alone, or as part of a carboxylic acid group) provide the reactive sites and thus act as linking groups between the base compound and the surfactant-like branches. Alternatively, in cases where both oxygen-containing functionalities and nitrogen-containing functionalities are present, such as in amino acids, both functionalities may provide reactive sites which act as linking groups between the base compound and the surfactant-like branches.

The term polyol, for this invention, basically covers any compound with at least three hydroxyl moieties thereon. Likewise, polycarboxylic acid encompasses compounds having at least three such acid moieties present thereon. Lactone is a heterocyclic compound with at least two oxygen groups thereon. Amino acid generally encompasses any of the 20 amino acids having a carboxylic acid and an amino functional group attached to the same tetrahedral carbon atom.

Thus, particular classes of polyols suitable for this purpose include, without limitation, tri- to octa-hydric alcohols such as pentaerythritol, diglycerol, α-methylglucoside, sorbitol, xylitol, mannitol, erythritol, dipentaerythritol, arabitol, glucose, sucrose, maltose, fructose, mannose, saccharose, galactose, leucrose, and other alditol or sugar molecules or polysaccharides; polybutadiene polyols; castor oil-derived polyols; hydroxyalkyl methacrylate copolymers; hydroxyalkyl acrylate polymers; polyvinyl alcohols; glycerine; 1,1,1-trimethylolpropane; 1,1,1-trimethylolethane; 1,2,6-hexanetriol; butanetriol; and mixtures thereof. Potentially preferred base compounds are the alditol types, particularly sorbitol and sucrose.

Suitable polycarboxylic acids include, without limitation, tartaric acid; citric acid; ascorbic acid; 2-phosphono-1,2,4-butane tricarboxylic acid; glucuronic acid; ethylenediaminetetraacetic acid; gluconic acid; cyclohexane hexacarboxylic acid; mellitic acid; saccharic acid; mucic acid; diethylenetriamine pentaacetic acid; glucoheptonic acid; lactobionic acid; 3,3',4,4'-benzophenone tetracarboxylic acid; amino propyl trimethoxysilane; aminopropyltriethoxysilane; 3-glycidoxypropyltrimethoxy silane; 3-glycidoxypropyltriethoxysilane; 3-(triethoxysilyl)propyl isocyanate; 3-(trimethoxysilyl) propyl isocyanate; diaminopropane-N,N,N',N'-tetraacetic acid; aconitic acid; isocitric acid; 1,2,3,4-butanetetracarboxylic acid; nitrilotriacetic acid; tricarballylic acid; N-(phosphonomethyl)iminodiacetic acid; 3-[[tris(hydroxymethyl)methyl]amino]-1-propanesulfonic acid; 2-[[tris (hydroxymethyl)methyl]amino]-1-ethanesulfonic acid; 3-[bis(2-hydroxyethyl)amino]-2-hydroxy-1-propanesulfonic acid; 3-[N-trishydroxymethylmethylamino]-2-hydroxypropanesulfonic acid; N-tris[hydroxymethyl]methyl-4-aminobutanesulfonic acid; 3-aminoadipic acid; 1,3-diamino-2-hydroxypropane-N,N,N',N'-tetraacetic acid; triethylenetetraaminehexaacetic acid; β-carboxyaspartic acid; α-hydroxymethylaspartic acid; tricine; 1,2,3,4-cyclopentanetetracarboxylic acid; 6-phosphogluconic acid; and mixtures thereof.

Suitable lactones include, without limitation, glucoheptonic lactone and glucooctanoic-γ-lactone. Suitable amino acids include, without limitation, aspartic acid, α-glutamic acid, and β-glutamic acid.

While it has been disclosed that the inventive additive formulation includes at least one multi-branched oxygen-containing polyfunctional compound-based wetting agent, yet another embodiment of the invention includes the use of at least one multi-branched oxygen-free polyamine compound-based wetting agent. The oxygen-free polyamine compound-based wetting agent contains at least three amine moieties, and it is believed that the amine moieties provide multiple highly reactive nitrogen-containing end groups for reaction with surfactant-like groups to form the desired branches therein. Thus, instead of reactive sites comprising oxygen-containing groups alone, or the combination of oxygen-containing and nitrogen-containing groups, as disclosed above, it is possible that nitrogen-containing groups alone can also be used as reactive sites which act as linking groups between the base compound and the surfactant-like branches. Examples of such oxygen-free polyamine compound-based wetting agents include, without limitation, diethylenetriamine, triethylenetetraamine, tetraethylenepentamine, and mixtures thereof.

The synthesis of the inventive wetting agents thus includes the reaction of surfactant-type compounds (which possess both hydrophobic and hydrophilic moieties) with the reactive (or functional) sites of the polyfunctional base compound. Thus, the wetting agent initially exists as a single compound (having both hydrophobic and hydrophilic moieties within each branch, and thus within the entire compound), and subsequently, after application to target hydrophobic substrates, may degrade into separate, individual surfactants free from the polyfunctional base compound. As a result, the wetting agent exhibits excellent ability to provide the necessary water adhesion to the hydrophobic surface of the water repellent plant growth media.

It is generally believed that this occurs through contact of the hydrophobic groups of the surfactant itself with the hydrophilic groups, which are free to provide the beneficial wetting characteristics, and, even upon such above-noted degradation, will still exhibit continued, effective wetting, and thus water transport, through the hydrophobic material. Any adhered water droplets will typically be pulled into the hydrophobic plant growth media via adhesion by other particles or through cohesion with other water droplets. Thus, such a wetting agent effectively permits appreciable and necessary amounts of moisture to penetrate the surface for beneficial moisture supply to the subterranean roots on a consistent and continuous basis for a relatively long period of time. As noted previously, the multi-branched aspect of this compound permits degradation of the compound without losing any appreciable ability to provide continued wetting characteristics within the targeted materials. Thus, use of the inventive additive formulation accords consistent and effective wetting and moisture penetration without any need for further labor-intensive and costly repeated applications of treatment formulations.

Such a wetting agent may be of any type as broadly described above and that provides the above-discussed water movement through function of the multi-branched structure. Preferably, and without limitation, such a wetting agent may be chosen from the class of compounds that are alditol-based, thus having five or more free oxygen groups for reaction with surfactant-type constituents to form the desired multiple branches thereon. Upon degradation of any or all such resultant oxygen linkages, the free constituents, as noted above, exhibit the necessary surfactant-like wetting benefits on a continuous basis. The compounds that meet such a description are broad, and, heretofore, have not been utilized for such plant growth media treatment purposes.

The following compounds may be suitable for use in synthesizing the inventive wetting agent. Basically, surfactant-type compounds are reacted with the free oxygens of the alditol base structure. This can be accomplished in any number of ways, most notably through the alkoxylation of polyfunctional reactive hydrogen-containing materials. Each reactive hydrogen-containing site typically includes alkylene oxide moieties, such as, for instance, ethylene oxide (EO; a/k/a ethyleneoxy), propylene oxide (PO; a/k/a propyleneoxy), and/or, butylene oxide (BO; a/k/a butyleneoxy) in a ratio of EO:PO or BO of from about 5:95 to about 95:5. The combined molecular weight of EO+PO or BO is generally from about 300 to about 20,000, and more preferably from about 500 to about 15,000, such that each branch becomes a typical wetting species. As the molecule biodegrades in the soil-free substructure, preferentially at the polyfunctional starting point as noted above, a new branch of wetter is introduced into the material for long-term performance.

Each of the possible variations for producing the multi-branched wetting agents provides the requisite water transport discussed previously, with the alditol-based types potentially preferred due to ease of manufacture and ease in degrading into constituent parts at a relatively controlled and consistent pace. The additive formulation may be entirely comprised of such a wetting agent or agents. Alternatively, the additive formulation may include a wetting agent or agents in the amount of from about 0.1% to about 99% by weight, from about 1% to about 99% by weight, from about 5% to about 95% by weight, or from about 10% to about 90% by weight, with the remainder of the additive formulation comprised of a mix of possible additives as noted below.

One possible additive that may be included in the formulation is at least one secondary compound that further aids in lowering of the surface tension of the plant growth media and that is also compatible with the aforementioned multi-branched wetting agent. The lowering of the surface tension allows more rapid penetration of the branched wetter into the hydrophobic material. Such a secondary compound can be an alkoxylated (preferably ethoxylated) alcohol (surfactant), such as a branched or unbranched $C_6$-$C_{60}$ alcohol alkoxylate (preferably, again, ethoxylate) (for utilization with the aforementioned multi-branched wetting agent), or alkoxylated (preferably ethoxylated) $C_8$-$C_{40}$ fatty acid (for utilization in combination with the aforementioned multi-branched wetting agent). Such secondary compounds can also be silicone surfactants or fluorocarbon-containing surfactants, which are widely known by those skilled in the art to reduce surface tension. Such compounds may be branched or unbranched in configuration. Examples of preferred types of alcohol alkoxylates for this purpose include $C_{6-60}$ alkyl, alkenyl or alkylaryl EO/PO surfactants. These surfactants may be linear or branched, and they may be further characterized by having secondary or primary hydroxyl groups. The secondary compound may include mixtures of surfactants comprising from about 1% to about 95% by weight of at least one surfactant selected from polyalkylene oxide compounds with the general formula:

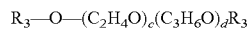
$$R_3\text{—}O\text{—}(C_2H_4O)_c(C_3H_6O)_dR_3$$

wherein c is 0 to 1100; d is 0 to 870; and $R_3$ is H, or an alkyl group with 1 to 4 carbon atoms; and wherein the polyalkylene oxide has a molecular weight in the range of 300 to 51,000; and a second optional different surfactant comprising a compound of the general formula:

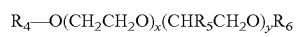
$$R_4\text{—}O(CH_2CH_2O)_x(CHR_5CH_2O)_yR_6$$

wherein x is from 1 to 50; y is from 0 to 50; $R_4$ is a branched or linear alkyl, alkenyl, aryl or an aryl group optionally having an alkyl group substituent, wherein the alkyl group substituent has up to 60 carbon atoms; $R_5$ is selected from H and alkyl groups having from 1 to 2 carbon atoms; and $R_6$ is selected from H and alkyl groups having from 1 to 30 carbon atoms. Suitable secondary surfactants also include carboxylic and dicarboxylic esters of the general formula:

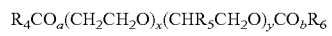
$$R_4CO_a(CH_2CH_2O)_x(CHR_5CH_2O)_yCO_bR_6$$

wherein x is from 1 to 50; y is from 1 to 50; a is from 1 to 2; b is from 0 to 1; $R_4$ is an alkyl or alkenyl group having up to 60 carbons or an aryl group optionally having an alkyl group substituent, wherein the alkyl group substituent has up to 60 carbon atoms; $R_5$ is selected from H and alkyl groups having from 1 to 2 carbon atoms; and $R_6$ is selected from H and alkyl groups having from 1 to 30 carbon atoms.

The secondary component, if included in the additive formulation, may be of any length and molecular weight with a preferred molecular weight of between about 1000 and about 15000, more preferably between about 2000 and about 3500, and most preferably between about 2750 and about 3250. If present, such secondary component may be present in an amount of from about 1 to about 85% by weight of the entire formulation, or more preferably from about 20 to about 80% by weight of the entire formulation.

The inventive additive formulations may include other horticultural components for lawn, garden, or other vegetation treatment, including, further wetting agents, cloud point raising emulsifiers known to those skilled in the art (such as polyalkylglucosides), or colorants (for aesthetic purposes or for application identification), perfumes, water, electrolytes, fertilizer, pesticides, growth hormones, minerals, spray pattern indicators (such as taught within U.S. Pat. No. 5,620,943 to Brendle), and the like.

EXAMPLES

The following examples are provided for illustration purposes and should not be considered as limiting the scope of the invention. These Examples are intended to demonstrate the wetting and re-wetting ability of organic material coated with the wetting agents of the current invention.

Several wetting agent pre-cursors were prepared for incorporation in the inventive wetting agents. The synthesis of the pre-cursors and the wetting agents is described below.

Wetting Agent Precursor Synthesis

The branched configuration for each wetting agent precursor is noted in parenthesis.

Sorbitol 12 PO (Hexa-Branched):

858 grams of 70% sorbitol were charged to the reactor. 7.2 grams of KOH flake was then added. The reactor was heated to 230° F. and vacuum stripped until the water content was less than 0.1%. The reactor was purged 3 times at 60 psi with nitrogen, heated to 250° F., and then 2296.8 grams of PO was added. After the addition of PO was complete, the vacuum was applied to the reactor to remove any unreacted oxide.

Sucrose 83 PO (Octa-Branched):

800 grams of Multranol® 9171 (obtained from Bayer Corporation) were charged to the reactor. 24.01 grams of KOH flake was then added. The reactor was heated to 230° F. and vacuum stripped until the water content was less than 0.1%. The reactor was purged 3 times at 60 psi with nitrogen, heated to 250° F., and then 3481 grams of PO was added. After the addition of PO was complete, the vacuum was applied to the reactor to remove any unreacted oxide.

Sorbitol 21 EO (Hexa-Branched):

500 grams of PSORB6 (from Synair Corporation) were charged to the reactor. 3.0 grams of KOH flake were then added. The reactor was heated to 230° F. and vacuum stripped until the water content was less than 0.1%. The reactor was purged 3 times with 60 psi with nitrogen, heated to 250° F., and then 715 grams of EO was added. After the addition of EO was complete, the vacuum was applied to the reactor to remove any unreacted oxide.

Sorbitol 15 PO (Hexa-Branched):

576 grams of 95% sorbitol was charged to the reactor. 8.6 grams of KOH flake was then added. The reactor was heated to 230° F. and vacuum stripped until the water content was less than 0.1%. The reactor was purged 3 times at 60 psi with nitrogen, heated to 250° F., and then 2644.8 grams of PO was added. After the addition of PO was complete, vacuum was applied to the reactor to remove any unreacted oxide.

Sorbitol 1650-60PO40EO Random:

600 grams of 95% sorbitol was charged to the reactor. 13 grams of KOH flake was then added. The reactor was heated to 230° F. and vacuum stripped until the water content was less than 0.1%. The reactor was purged 3 times at 60 psi with nitrogen, heated to 250° F., and then 4590 grams of a PO/EO mix was added. After the addition of the mix was complete, vacuum was applied to the reactor to remove any unreacted oxide. The hydroxyl number of the reaction product was 198.7.

Wetting Agent Synthesis

The structural arrangement (i.e. Random or Block) for each wetting agent is shown below. The amount of PO and EO for each wetting agent is also provided as a percentage (by weight) of the wetting agent. Additionally, the molecular weight of each wetting agent is also provided (i.e. 1650, 9000, 12000).

Example 1

Sorbitol 9000-40PO20EO40PO Block 300 grams of Sorbitol 12 PO were charged to the reactor. 7.4 grams of KOH flake was then added. The reactor was heated to 230° F. and vacuum stripped until the water content was less than 0.1%. The reactor was purged 3 times at 60 psi with nitrogen, heated to 250° F., and then 1130 grams of PO was added. After the addition of PO was complete, 995 grams of EO was added. After the addition of EO was complete, 980 grams of PO was added. Vacuum was applied to the reactor to remove any unreacted oxide. The resulting compound has a molecular weight of 9000.

Example 2

Sorbitol 9000-80PO20EO Block 600 grams of Sorbitol 12 PO was charged to the reactor. 8.6 grams of KOH flake was then added. The reactor was heated to 230° F. and vacuum stripped until the water content was less than 0.1%. The reactor was purged 3 times at 60 psi with nitrogen, heated to 250° F., and then 3636.5 grams of PO was added. After the addition of PO was complete, 1104.6 grams of EO was added. Vacuum was applied to the reactor to remove any unreacted oxide. The resulting compound has a molecular weight of 9000.

Example 3

Sorbitol 9000-10EO80PO10EO Block 300 grams of Sorbitol 21 EO were charged to the reactor. 5.4 grams of KOH flake was then added. The reactor was heated to 230° F. and vacuum stripped until the water content was less than 0.1%. The reactor was purged 3 times at 60 psi with nitrogen, heated to 250° F., and then 1910 grams of PO was added. After the addition of PO was complete, 508 grams of EO was added. Vacuum was applied to the reactor to remove any unreacted oxide. The resulting compound has a molecular weight of 9000.

Example 4

Sorbitol 9000-60PO40EO Block 531 grams of Sorbitol 15 PO was charged to the reactor. 10.8 grams of KOH flake was then added. The reactor was heated to 230° F. and vacuum stripped until the water content was less than 0.1%. The reactor was purged 3 times at 60 psi with nitrogen, heated to 250° F., and then 2204.6 grams of PO was added. After the addition of PO was complete, 1613.9 grams of EO was added. Vacuum was applied to the reactor to remove any unreacted oxide. The resulting compound has a molecular weight of 9000.

Example 5

Sorbitol 9000-60PO40EO Random 495 grams of Sorbitol 1650 (60/40 Random) was charged to the reactor. 6.7 grams of KOH flake was then added. The reactor was heated to 230° F. and vacuum stripped until the water content was less than 0.1%. The reactor was purged 3 times at 60 psi with nitrogen, heated to 250° F., and then 2210 grams of a PO/EO mix was added. After the addition of the mix was complete, vacuum was applied to the reactor to remove any unreacted oxide. The resulting compound has a molecular weight of 9000.

Example 6

Sucrose 12000-80PO20EO Block 1010 grams of Sucrose 83 PO were charged to the reactor. The reactor was heated to 230° F. and vacuum stripped until the water content was less than 0.1%. The reactor was purged 3 times at 60 psi with nitrogen, heated to 250° F., and then 1170 grams of PO was added. After the addition of PO was complete, 730 grams of EO was added. Vacuum was applied to the reactor to remove any unreacted oxide. The resulting compound has a molecular weight of 12000.

Example 7

Sucrose 12000-40PO20EO40PO Block 2020 grams of Sucrose 83 PO were charged to the reactor. The reactor was heated to 230° F. and vacuum stripped until the water content was less than 0.1%. The reactor was purged 3 times at 60 psi with nitrogen, heated to 250° F., and then 1165 grams of EO was added. After the addition of EO was complete, 1685 grams of PO was added. Vacuum was applied to the reactor to remove any unreacted oxide. The resulting compound has a molecular weight of 12000.

Comparative Example 1

Pluronic® L62 is a di-functional, block alkoxylated polyol non-ionic surfactant, available from BASF. The surfactant has a molecular weight of 2500.

Comparative Example 2

Surfonic® N-95 is a Nonylphenol Ethoxylate Non-Ionic Surfactant, Available from Huntsman Chemical Corporation Wettability/Re-wettability Test Procedure
1. Coating the Soil-Free Organic Material
  5 grams of organic material was added to a quart size plastic bag. To the bag, 15 ml of a wetting agent solution was added (the specific concentration of the wetting agent in the solution is notated in the Examples below). The bag was zipped closed and shaken for 30 seconds to ensure uniform distribution of the wetting agent on the organic material. The coated material was left in the bag for one hour. The contents of the bag were then pour out into a round aluminum pan and placed in a forced air oven at 50° C. for 16 hours. A control sample was also prepared in the same manner as described herein, except that the sample was only treated with water.
2. Wettability Test of the Coated Soil-Free Organic Material
  After the coated organic material was dried, approximately one-half level teaspoon of the material was added to 80 ml of 70° F. deionized water in a 100 ml beaker. The material was dropped onto the surface of the water. The amount of time it took for the coated organic material to be completely wet was recorded. The tested sample is denoted as "Initial Wet" below.
3. Re-Wettability Test of the Coated Soil-Free Organic Material
  To determine re-wettability, the coated organic material from Step 2 (above) was subjected to a rinse and dry step. The coated organic material was placed in a beaker of water and stirred for about 60 seconds ("rinse"). The mixture was then filtered using filter paper to remove the excess water. The organic material was then dried in the oven as specified in step 1. After the organic material was dry, it was tested for wettability as described in step 2. The tested sample is denoted as "Re-Wet 1" below.
  The coated organic material was subjected a second rinse and dry step, and the tested sample is denoted as "Re-Wet 2" below.
Test Results
  All of the Examples and Comparative Examples were tested according to the previously described Wettability/Re-wettability Test Procedure for various plant growth media.
  Table 1 shows the results of wetting agent performance on sphagnum peat moss using a solution containing 1% by weight of the wetting agent. Table 2 shows the results of wetting agent performance on sphagnum peat moss using a solution containing 0.33% by weight of the wetting agent. Table 3 shows the results of wetting agent performance on cocomoss, a form of plant growth media formed from natural coconut fiber (available from Austram, Inc.), using a solution containing 0.33% by weight of the wetting agent. The amount of time that it took the coated organic material to become completely wet was recorded. The less time it took for the plant growth media to wet, the better the wetting agent was at providing moisture penetration to alleviate the hydrophobic conditions of the media.

TABLE 1

1% Wetting Agent Performance on *Sphagnum* Peat Moss

| | | Time (seconds) | | |
|---|---|---|---|---|
| Sample | Sample Description | Initial Wet | Re-Wet 1 | Re-Wet 2 |
| Example 1 | Sorbitol 9000 40/20/40 Block | 5 | 17 | 49 |
| Example 2 | Sorbitol 9000 80/20 Block | 6 | 23 | 79 |
| Example 3 | Sorbitol 9000 10/80/10 Block | 5 | 25 | 103 |
| Example 4 | Sorbitol 9000 60/40 Block | 7 | 38 | 48 |
| Example 5 | Sorbitol 9000 60/40 Random | 27 | 43 | 52 |
| Example 6 | Sucrose 12000 80/20 Block | 8 | 21 | 29 |
| Example 7 | Sucrose 12000 40/20/40 Block | 9 | 42 | 59 |
| Comparative Example 1 | Pluronic ® L-62 | 67 | 128 | 138 |
| Comparative Example 2 | Surfonic ® N-95 | 69 | 112 | 149 |
| Control | Water only | >1 hour | >1 hour | >1 hour |

TABLE 2

0.33% Wetting Agent Performance on *Sphagnum* Peat Moss

| | | Time (seconds) | | |
|---|---|---|---|---|
| Sample | Sample Description | Initial Wet | Re-Wet 1 | Re-Wet 2 |
| Example 1 | Sorbitol 9000 40/20/40 Block | 15 | 131 | 145 |
| Example 2 | Sorbitol 9000 80/20 Block | 27 | 114 | 150 |
| Example 3 | Sorbitol 9000 10/80/10 Block | 17 | 104 | 145 |
| Example 4 | Sorbitol 9000 60/40 Block | 30 | 100 | 113 |
| Example 5 | Sorbitol 9000 60/40 Random | 46 | 148 | 208 |
| Example 6 | Sucrose 12000 80/20 Block | 23 | 112 | 116 |
| Example 7 | Sucrose 12000 40/20/40 Block | 19 | 85 | 133 |
| Comparative Example 1 | Pluronic ® L-62 | 232 | 492 | 525 |
| Comparative Example 2 | Surfonic ® N-95 | 136 | 195 | 278 |
| Control | Water only | >1 hour | >1 hour | >1 hour |

The test results in both Table 1 and Table 2 illustrate that the inventive multi-branched wetting agents clearly demonstrate effective wetting and re-wetting of the dry peat moss. The results also demonstrate superior performance over prior art wetting agents (Comparative Examples 1 and 2). More specifically, Table 1 shows that for initial wetting at 1% wetting agent concentration, most of the inventive wetting agents wet the peat moss in less than 10 seconds, while the Comparative Examples took more than one minute to achieve wetting. For the first re-wetting procedure at 1% wetting agent concentration, all of the inventive wetting agents wet the peat moss in less than 45 seconds, while the Comparative Examples took about 2 minutes, on average, to achieve wetting. For the second re-wetting procedure at 1% wetting agent concentration, most of the inventive wetting agents wet the peat moss in less than 80 seconds, while the Comparative Examples took more than 2 minutes to achieve wetting.

The test results provided in Table 2 also demonstrate that at lower wetting agent concentrations, the inventive wetting agents still provide very good wetting and re-wetting of the dry peat moss. The majority of Examples 1-7 initially wet the peat moss in less than 30 seconds, while it took the Comparative Examples between 2 and 4 minutes to wet the peat moss. For the first re-wetting procedure, most of Examples 1-7 wet the peat moss in less than 2 minutes, while the Comparative Examples required 3 to 8 minutes to achieve wetting. Similarly, for the second re-wetting procedure, most of Examples 1-7 wet the peat moss in 2.5 minutes or less, while the Comparative Examples required 4.5 to almost 9 minutes to achieve wetting.

TABLE 3

0.33% Wetting Agent Performance on Cocomoss

| | | Time (seconds) | | |
|---|---|---|---|---|
| Sample | Sample Description | Initial Wet | Re-Wet 1 | Re-Wet 2 |
| Example 1 | Sorbitol 9000 40/20/40 Block | 2.2 | 2.5 | 3.3 |
| Example 2 | Sorbitol 9000 80/20 Block | 2.2 | 2.4 | 2.8 |
| Example 3 | Sorbitol 9000 10/80/10 Block | 2.3 | 2.5 | 2.8 |
| Example 6 | Sucrose 12000 80/20 Block | 2.4 | 2.6 | 2.9 |
| Comparative Example 1 | Pluronic ® L-62 | 8.7 | 8.9 | 20.2 |
| Comparative Example 2 | Surfonic ® N-95 | 3.2 | 3.5 | 10.1 |
| Control | Water only | 68.2 | 79.9 | 154.1 |

The test results in Table 3 illustrate that the inventive multi-branched wetting agents clearly demonstrate effective wetting and re-wetting of cocomoss. The results also demonstrate superior performance over prior art wetting agents (Comparative Examples 1 and 2). More specifically, Table 3 shows that for initial wetting at 0.33% wetting agent concentration, all of the inventive wetting agents achieved wetting of the cocomoss in less than 2.5 seconds, while the Comparative Examples took between 3 and almost 9 seconds to achieve wetting. For the first re-wetting procedure, all of the inventive wetting agents achieved wetting in 2.6 seconds or less, while the Comparative Examples took 3.5 to almost 9 seconds to achieve wetting. For the second re-wetting procedure, all of the inventive wetting agents achieved wetting in 3.3 seconds or less, while the Comparative Examples took between about 10 and 20 seconds to achieve wetting.

Thus, the test results provided in the Tables demonstrate that the inventive multi-branched wetting agents effectively reduce the hydrophobicity of various types of plant growth media, and furthermore, exhibit excellent durability to repeated cycles of wetting. The results further substantiate the superior performance of the inventive branched wetting agent over the prior art wetting agents, as well as over the control sample, which did not receive treatment with a wetting agent.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A method of reducing the hydrophobicity of plant growth media comprising the application of an additive formulation to the plant growth media, said additive formulation comprised of a multi-branched wetting agent having a polyol compound and at least three surfactant branches comprising alkylene oxide moieties attached thereto, wherein said polyol compound is sucrose, and wherein each surfactant branch includes both hydrophilic and hydrophobic constituents.

2. The method of claim 1 wherein the additive formulation is present in a form selected from the group consisting of a liquid, a pellet, and a grain.

3. An additive formulation for reducing the hydrophobicity of plant growth media, the additive formulation comprising a multi-branched wetting agent having a polyol compound and at least three surfactant branches comprising alkylene oxide moieties attached thereto, wherein said polyol compound is sucrose, and wherein each surfactant branch includes both hydrophilic and hydrophobic constituents.

4. The additive formulation of claim 3 wherein the additive formulation is present in a form selected from the group consisting of a liquid, a pellet, and a grain.

* * * * *